United States Patent
Han et al.

(10) Patent No.: US 8,942,079 B2
(45) Date of Patent: Jan. 27, 2015

(54) METHOD AND APPARATUS FOR MAPPING/DEMAPPING MODULATION SYMBOLS IN A MOBILE COMMUNICATION SYSTEM

(75) Inventors: Jin-Kyu Han, Seoul (KR); Ju-Ho Lee, Suwon-si (KR); Joon-Young Cho, Suwon-si (KR); Hwan-Joon Kwon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 841 days.

(21) Appl. No.: 12/102,390

(22) Filed: Apr. 14, 2008

(65) Prior Publication Data

US 2008/0267122 A1 Oct. 30, 2008

(30) Foreign Application Priority Data

Apr. 13, 2007 (KR) ........................ 10-2007-0036669

(51) Int. Cl.
- *H04J 9/00* (2006.01)
- *H04J 1/00* (2006.01)
- *H04K 1/10* (2006.01)
- *H04L 25/02* (2006.01)
- *H04L 5/00* (2006.01)

(52) U.S. Cl.
CPC .......... *H04L 25/0226* (2013.01); *H04L 5/0048* (2013.01); *H04L 5/0023* (2013.01); *H04L 5/0037* (2013.01); *H04L 5/0044* (2013.01)
USPC ............................ 370/204; 370/480; 375/260

(58) Field of Classification Search
USPC ......... 370/203, 204, 208, 211, 464–469, 480, 370/533–545; 455/8, 10, 59, 69, 72, 103, 455/266; 375/260, 299
See application file for complete search history.

(56) References Cited

U.S. PATENT DOCUMENTS

| | | | |
|---|---|---|---|
| 7,027,782 B2 * | 4/2006 | Moon et al. .................... | 455/102 |
| 7,376,117 B2 * | 5/2008 | Erlich et al. .................. | 370/343 |
| 2002/0141433 A1 | 10/2002 | Kwon et al. | |
| 2003/0014709 A1 * | 1/2003 | Miyoshi et al. ............... | 714/758 |
| 2003/0060173 A1 * | 3/2003 | Lee et al. ...................... | 455/103 |
| 2003/0081576 A1 * | 5/2003 | Kim et al. ..................... | 370/335 |
| 2005/0018750 A1 * | 1/2005 | Foerster et al. ............... | 375/130 |
| 2005/0160347 A1 * | 7/2005 | Kim et al. ..................... | 714/776 |
| 2006/0023680 A1 * | 2/2006 | Oh et al. ....................... | 370/338 |
| 2006/0245384 A1 * | 11/2006 | Talukdar et al. .............. | 370/310 |
| 2007/0121742 A1 * | 5/2007 | Tamaki et al. ................ | 375/260 |
| 2007/0223618 A1 | 9/2007 | Jeong et al. | |
| 2008/0267122 A1 | 10/2008 | Han et al. | |

FOREIGN PATENT DOCUMENTS

| | | |
|---|---|---|
| KR | 1020070090596 | 9/2007 |
| KR | 1020080092801 | 10/2008 |

* cited by examiner

*Primary Examiner* — Redentor Pasia
(74) *Attorney, Agent, or Firm* — The Farrell Law Firm, P.C.

(57) ABSTRACT

A method for mapping wireless resources of reference symbols for channel state estimation and modulation symbols for user information transmission in a transmitter of an Orthogonal Frequency Division Multiplexing (OFDM) mobile communication system is disclosed. The mapping method includes channel-encoding and modulating a user information stream to be transmitted, and then generating a systematic symbol stream and a parity symbol stream; and preferentially arranging systematic modulation symbols in resource elements of a symbol including no reference symbol, and then arranging parity modulation symbols in remaining resource elements.

7 Claims, 7 Drawing Sheets

METHOD AND APPARATUS FOR MAPPING/DEMAPPING MODULATION SYMBOLS IN A MOBILE COMMUNICATION SYSTEM

PRIORITY

This application claims priority under 35 U.S.C. §119(a) to a Korean Patent Application filed in the Korean Intellectual Property Office on Apr. 13, 2007 and assigned Serial No. 2007-36669, the disclosure of which is incorporated herein by reference.

BACKGROUND OF THE INVENTION

1. Field of the Invention

The present invention relates generally to a communication system using a multiple access scheme, and in particular, to a method and apparatus for transmitting and receiving both reference symbols and data symbols.

2. Description of the Related Art

Recently, in mobile communication systems, intensive research is being conducted on Orthogonal Frequency Division Multiplexing (OFDM) as a scheme useful for high-speed data transmission in wire/wireless channels. OFDM, a scheme for transmitting data using multiple carriers, is a type of Multi-Carrier Modulation (MCM) that converts a serial input symbol stream into parallel symbol streams and modulates each of them with a plurality of orthogonal frequency tones, i.e., subcarrier channels, before transmission.

The MCM-based system was first applied to military high-frequency radios in the late 1950s, and the OFDM scheme, which overlaps multiple orthogonal subcarriers, has been developing since 1970s. But there were limitations on its application to the actual systems due to the difficulty in realization of orthogonal modulation between multiple carriers. However, the OFDM scheme has undergone rapid development since Weinstein et al. presented in 1971 that OFDM-based modulation/demodulation can be efficiently processed using DFT (Discrete Fourier Transform). In addition, as a scheme is known that uses a guard interval and inserts a Cyclic Prefix (CP) symbol into the guard interval, the negative influence of the system on the multiple paths and delay spread has been reduced significantly.

Owing to such technical developments, the OFDM technology is being widely applied to the digital transmission technologies such as Digital Audio Broadcasting (DAB), Digital Video Broadcasting (DVB), Wireless Local Area Network (WLAN), Wireless Asynchronous Transfer Mode (WATM), etc. That is, the OFDM scheme could not be widely used before due to its high hardware complexity, but the development of various digital signal processing technologies including Fast Fourier Transform (FFT) and Inverse Fast Fourier Transform (IFFT) has enabled its realization. The OFDM scheme, though it is similar to the conventional Frequency Division Multiplexing (FDM) scheme, can obtain optimal transmission efficiency during high-seed data transmission by maintaining orthogonality between multiple tones during transmission. In addition, the OFDM scheme can obtain the optimal transmission efficiency during high-speed data transmission as it has high frequency utilization efficiency and is robust against multipath fading. Further, the OFDM scheme, as it overlaps frequency spectra, has high frequency utilization efficiency, is robust against frequency selective fading, can reduce an Inter-Symbol Interference (ISI) effect with the use of a guard interval, can design simple hardware of an equalizer, and is robust against impulse noises. Therefore, the OFDM scheme is used for various communication systems.

In wireless communications, high-speed, high-quality data services are generally hindered by the channel environments. In wireless communications, the channel environments suffer from frequent changes not only due to additive white Gaussian noise (AWGN) but also power variation of received signals, caused by a fading phenomenon, shadowing, a Doppler effect brought by movement of a terminal and a frequent change in a velocity of the terminal, interference by other users or multipath signals, etc. Therefore, in order to support high-speed, high-quality data services in wireless communication, there is a need to efficiently overcome the above factors.

In OFDM, modulation signals are located in the two-dimensional time-frequency resources. Resources on the time domain are divided into different OFDM symbols, and are orthogonal with each other. Resources on the frequency domain are divided into different tones, and are also orthogonal with each other. That is, the OFDM scheme defines one minimum unit resource by designating a particular OFDM symbol on the time domain and a particular tone on the frequency domain, and the unit resource is called a "frequency-time bin". Since different frequency-time bins are orthogonal with each other, signals transmitted with different frequency-time bins can be received without causing interference to each other. In terms of resource allocation, the frequency-time bin is also called a "Resource Element (RE)".

The mobile communication environment has a characteristic that channels vary randomly. In order to solve problems caused by the channel variation, most mobile communication systems are designed to support coherent demodulation that includes a process of estimating states of channels and correcting the estimated channel states. In order to estimate the random states of channels, a signal previously agreed upon between a transmitter and a receiver is transmitted. Such a signal is called a "pilot" or "Reference Symbol (RS) signal". The receiver, by receiving the RS signal, estimates states of channels and corrects the estimated channel states, thereby performing demodulation. The number of RS signals transmitted should be large enough to be able to estimate the change in channels, and it is preferable that they are not damaged by data signals. In the OFDM system, it is possible to prevent RS signals from being damaged by data signals by arranging the RS signals in predetermined frequency-time bins.

Figure 1:
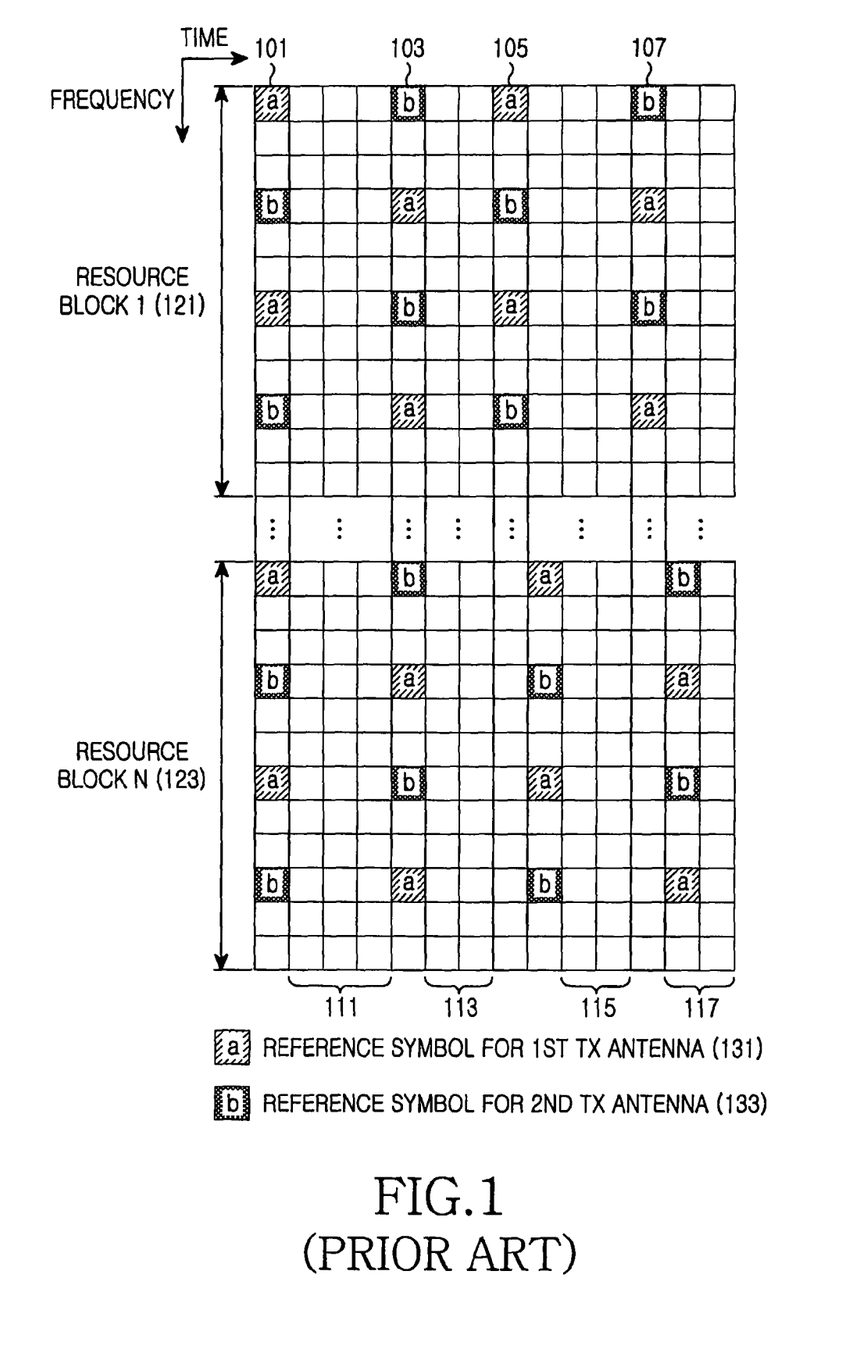
FIG. 1 is a diagram illustrating an RS pattern when 2 transmit antennas are used, according to the prior art.

FIG. 1 illustrates an RS pattern when 2 transmit antennas are used, defined by a Long Term Evolution (LTE) system of the $3^{rd}$ Generation Partnership Project (3GPP).

Referring to FIG. 1, one Resource Block (RB) is composed of 12 tones on the frequency domain and 14 OFDM symbols on the time domain. Shown in FIG. 1 is a bandwidth composed of a total of N RBs of RB#1 121 to RB#N 123.

Of frequency-time bins, bins 131 denoted by "a" are RSs transmitted via a first antenna, and bins 133 denoted by "b" are RSs transmitted via a second antenna. If a base station has one transmit antenna, the frequency-time bins 133 denoted by "b" will be used for data transmission. Since RS signals are previously agreed upon between a base station and a terminal, the terminal can estimate channels from the first transmit antenna based on received signals of the frequency-time bins "a" 131, and estimate channels from the second transmit antenna based on received signals of the frequency-time bins "b" 133.

Regarding the characteristics of the RS pattern shown in FIG. 1, OFDM symbols are divided into symbols including RSs and symbols including no RS. That is, while RSs are defined in a $1^{st}$ OFDM symbol 101, a $5^{th}$ OFDM symbol 103, an $8^{th}$ OFDM symbol 105 and a $12^{th}$ OFDM symbol 107, no RS is defined in the remaining OFDM symbols 111, 113, 115 and 117. Regarding RSs for one transmit antenna, every $6^{th}$ tone is inserted, and regarding even RSs for another transmit antenna, every $6^{th}$ tone is inserted between the RS tones.

Figure 2:
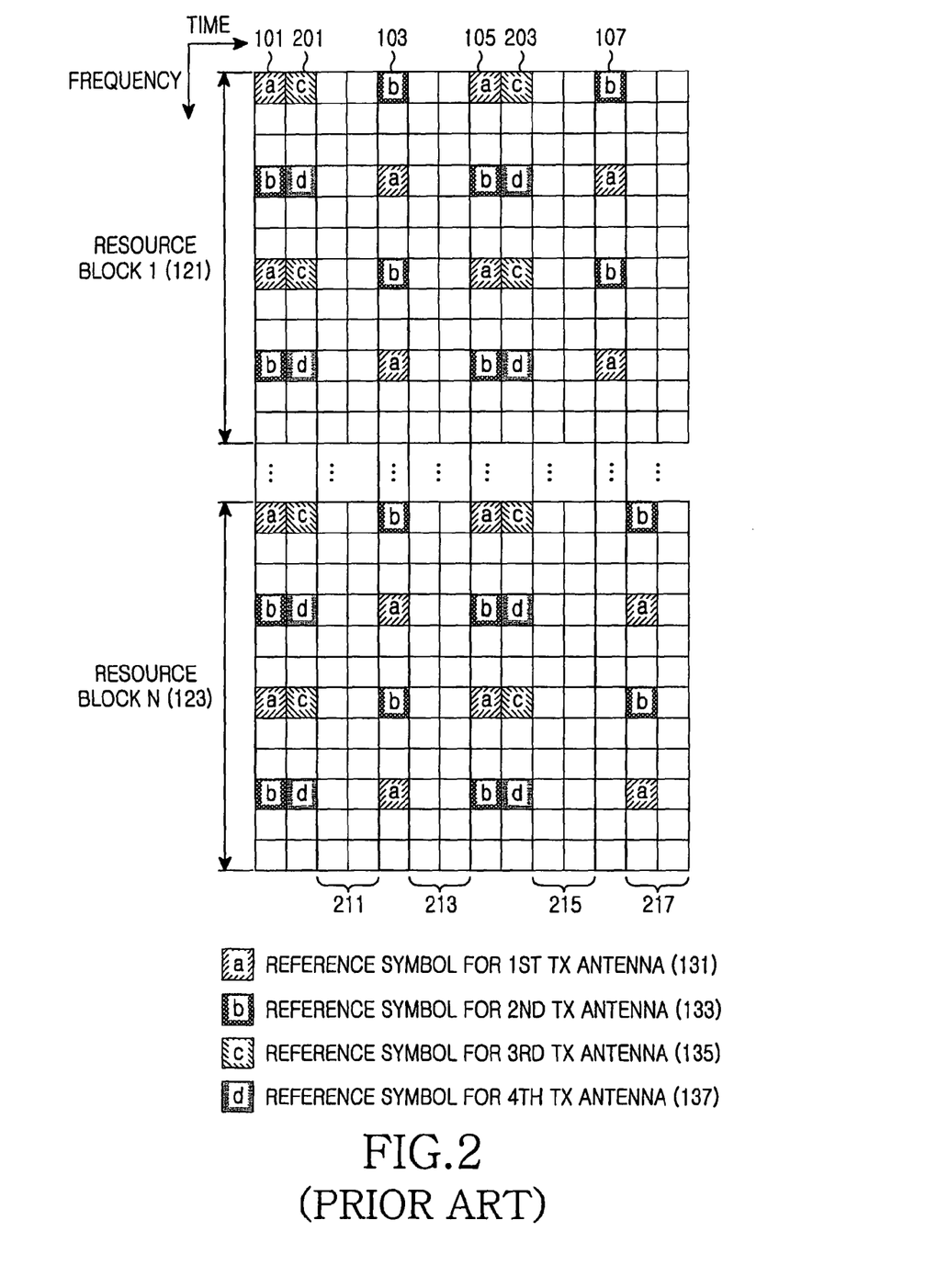
FIG. 2 is a diagram illustrating an RS pattern when 4 transmit antennas are used, according to the prior art.

FIG. 2 illustrates an RS pattern when 4 transmit antennas are used.

Referring to FIG. 2, RSs 131 for a first transmit antenna and RSs 133 for a second transmit antenna are inserted in the same positions as those of FIG. 1, and RS 135 for a third transmit antenna and RS 137 for a fourth transmit antenna are additionally defined. Since the added RSs are arranged in a $2^{nd}$ OFDM symbol 201 and a $9^{th}$ OFDM symbol 203, OFDM symbols including RSs include 6 OFDM symbols 101, 103, 105, 107, 201 and 203 among a total of 14 OFDM symbols, and the remaining OFDM symbols 211, 213, 215 and 217 include no RS.

In order to guarantee channel estimation performance of terminals, there is a need to allocate sufficient power for RSs. In particular, when data is transmitted to a terminal having a poor channel state, a required Signal to Noise Ratio (SNR) is secured with use of a method such as Automatic Repeat reQuest (ARQ). However, for RSs, it is not possible to improve their SNR through ARQ, so there is a need to sufficiently secure power of RSs. Therefore, power of RSs is first allocated and the remaining power is used for data transmission. In this case, when sufficient power is allocated for RSs, available power per tone for data transmission in OFDM symbols including RSs may be lower than that in OFDM symbols including no RS.

Figure 3:
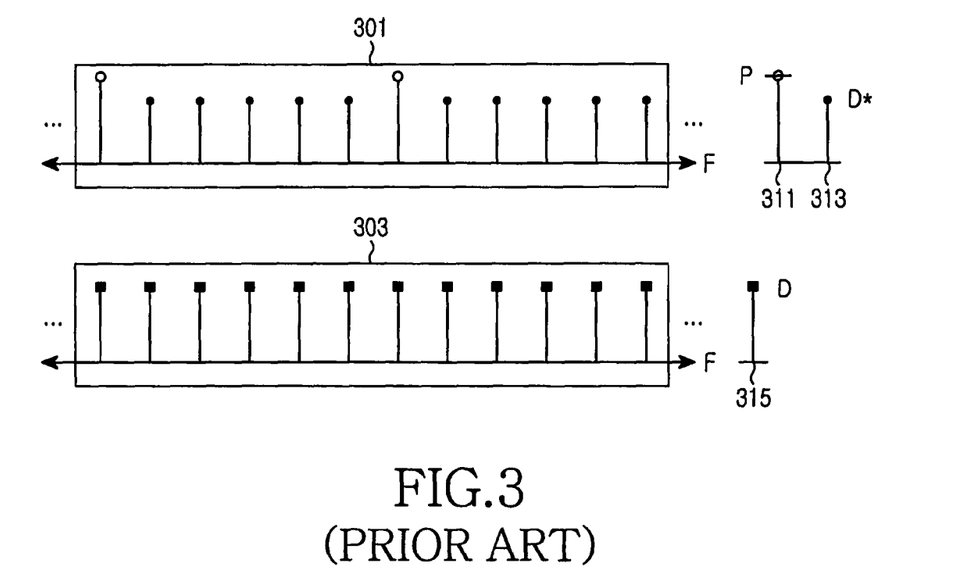
FIG. 3 is a diagram illustrating power allocation for data tones based on RS power allocation according to the prior art.

FIG. 3 illustrates power allocation for data tones according to RS power allocation when there is one transmit antenna.

Referring to FIG. 3, reference numeral 301 represents tones defined in one RB in OFDM symbols including RSs, and reference numeral 303 represents tones in OFDM symbols including no RS. Reference numeral 301 represents RB of OFDM symbols 101 and 105 of FIG. 1, and the RB 301 is composed of RS tones 311 and data tones 313. The RB 303 is composed of only data tones 315. Power P is allocated to RS tones, and its value is set higher than power D of data tones in OFDM symbols including no RS. A condition that a sum of power allocated to one RB is equal for each OFDM symbol can be expressed as Equation (1).

$$NRS \times P + (N-NRS) \times D^* = N \times D \quad (1)$$

In Equation (1), N denotes the number of tones constituting one RB, and N=12 in the example of FIG. 3; NRS denotes the number of RS tones defined in one RB in an OFDM symbol including RSs, and NRS=2 in the example of FIG. 3; and D* denotes power of data tones in an OFDM symbol including RSs.

If P>D, since N>NRS, D*<D as shown in Equation (2).

$$P-D=(N/NRS-1)\times(D-D^*)>0 \quad (2)$$

That is, power of data tones in an OFDM symbol including RSs must be set lower than power of data tones in an OFDM symbol having no RS.

Figure 4:
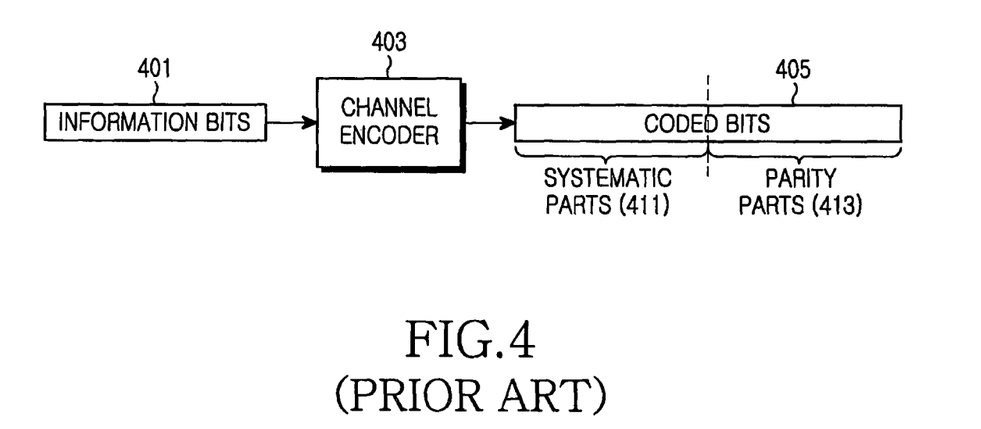
FIG. 4 is a diagram illustrating a general channel coding process.

FIG. 4 illustrates a general channel coding process. When a user's information bit stream 401 is input to a channel encoder 403, a coded bit stream 405 is output. The coded bit stream 405 can be divided into a systematic bit stream 411 which is the same bit stream as the user's information bit stream 401 being input to the channel encoder 403, and a parity bit stream 413 whose decoding performance is improved. If a receiver has failed in successfully restoring the user's information bit stream 401 by first receiving the systematic bit stream 411, it attempts decoding referring to both the parity bit stream 413 and the systematic bit stream 411. That is, if the receiver has successfully restored the transmission signal only with the systematic bit stream, it has no need to perform an additional decoding process. In terms of the decoding performance, the systematic bit stream is more important than the parity bit stream. When the systematic bit stream and the parity bit stream are damaged in the same ratio, the damaged systematic bit stream causes a greater reduction in the final decoding performance, compared to the damaged parity bit stream. Therefore, the use of a method capable of protecting the systematic bit stream if possible, shows higher performance compared to the use of a method for protecting the parity bit stream.

SUMMARY OF THE INVENTION

An aspect of the present invention is to address at least the problems and/or disadvantages above and to provide at least the advantages described below. Accordingly, an aspect of the present invention is to provide a method and apparatus for mapping modulation symbols to Resource Elements (REs) taking arrangement of RSs into account so that a systematic bit stream may be better protected than a parity bit stream.

Another aspect of the present invention is to provide a method and apparatus capable of improving decoding performance in the same channel environment.

According to one aspect of the present invention, there is provided a method for mapping wireless resources of reference symbols for channel state estimation and modulation symbols for user information transmission in a transmitter of an Orthogonal Frequency Division Multiplexing (OFDM) mobile communication system. The mapping method includes channel-encoding and modulating a user information stream to be transmitted; generating a systematic symbol stream containing systematic modulation symbols and a parity symbol stream containing parity modulation symbols using the user information stream; and preferentially arranging the systematic modulation symbols in resource elements of a symbol including no reference symbol, and then arranging the parity modulation symbols in remaining resource elements.

According to another aspect of the present invention, there is provided a method for demapping wireless resources of reference symbols for channel state estimation and modulation symbols for user information transmission in a receiver of an Orthogonal Frequency Division Multiplexing (OFDM) mobile communication system. The demapping method includes detecting, from a received signal, a systematic symbol stream containing systematic modulation symbols arranged in resource elements of a symbol including no reference symbol and detecting a parity symbol stream containing parity modulation symbols arranged in remaining resource elements; deinterleaving the systematic symbol stream and the parity symbol stream separately; demodulating the systematic symbol stream and the parity symbol stream independently, to convert them into a systematic bit stream and a parity bit stream, respectively; and combining the systematic bit stream with the parity bit stream, and decoding the combined bit stream to generate a user information stream.

According to further another aspect of the present invention, there is provided an apparatus for mapping modulation symbols according to power allocation for reference symbols in a transmitter of a mobile communication system. The mapping apparatus includes a channel encoder for converting an input user bit stream into a coded bit stream; a demultiplexer for demultiplexing the coded bit stream into a systematic bit stream and a parity bit stream; a first modulator for modulating the systematic bit stream; a second modulator for modulating the parity bit stream; a first interleaver for interleaving the systematic bit stream output from the first modulator; a second interleaver for interleaving the parity bit stream output from the second modulator; and a resource element mapper for preferentially arranging the systematic bit stream output from the first interleaver in resource elements of a symbol including no reference symbol, and arranging the parity bit stream output from the second interleaver in remaining resource elements.

According to yet another aspect of the present invention, there is provided an apparatus for demapping modulation symbols according to power allocation for reference symbols in a receiver of a mobile communication system. The demapping apparatus includes a reception processor for converting a received radio signal into baseband data; a resource element demapper for detecting, from among symbols output from the reception processor, a systematic symbol stream arranged in resource elements of a symbol including no reference symbol and detecting a parity symbol stream arranged in remaining resource elements; a first deinterleaver for deinterleaving the systematic symbol stream; a second deinterleaver for deinterleaving the parity symbol stream; a first demodulator for demodulating the systematic symbol stream output from the first deinterleaver; a second demodulator for demodulating the parity symbol stream output from the second deinterleaver; a multiplexer for multiplexing the systematic bit stream and the parity bit stream output from the first and second demodulators; and a channel decoder for converting the bit stream output from the multiplexer into a decoded user bit stream.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. The matters defined in the description such as a detailed construction and elements are provided to assist in a comprehensive understanding of the preferred embodiments of the invention. Accordingly, those of ordinary skill in the art will recognize that various changes and modifications of the embodiment described herein can be made without departing from the scope and spirit of the invention. Also, descriptions of well-known functions and constructions are omitted for clarity and conciseness.

The present invention provides a technology for mapping modulation symbols to REs so that parts corresponding to a systematic bit stream in a coded bit stream should not be allocated to REs of an OFDM symbol including RSs, when power allocated to REs of the OFDM symbol including RSs is set lower than power allocated to REs of an OFDM symbol including no RS due to the power allocation for RSs, thereby improving decoding performance. To this end, it is necessary to divide modulation symbols into systematic modulation symbols generated only with systematic bits and parity modulation symbols generated only with parity bits, and process the modulation symbols so that the systematic modulation symbols may not be allocated to REs of an OFDM symbol including RSs.

Figure 5:
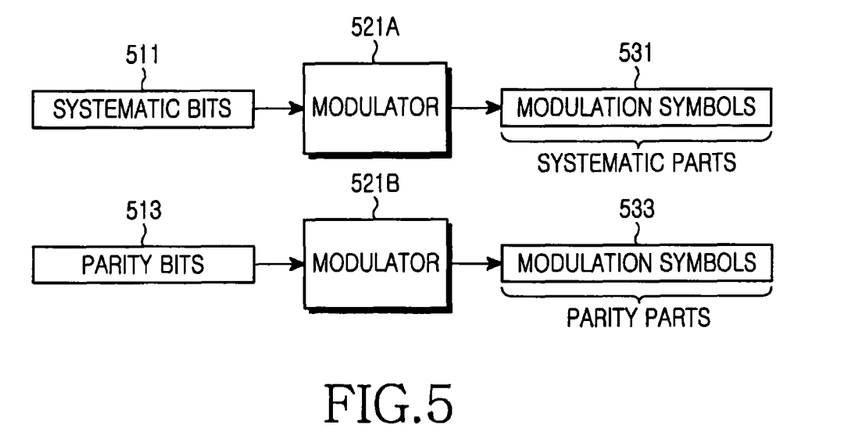
FIG. 5 is a diagram illustrating a modulation process of converting a systematic bit stream and a parity bit stream into a systematic modulation symbol stream and a parity modulation symbol stream through modulation, respectively, according to an embodiment of the present invention.

FIG. 5 illustrates a modulation process of converting a systematic bit stream 511 and a parity bit stream 513 into a systematic modulation symbol stream 531 and a parity modulation symbol stream 533 through modulation, respectively.

Modulators 521A and 521B perform the same modulation scheme. The modulation scheme is determined based on a downlink Channel Quality Indicator (CQI) being fed back from a terminal to a base station and a status of a transmission buffer in the base station, etc. Although the modulation scheme is subject to change according to the above conditions, the modulation scheme applied to the systematic bit stream is equal to the modulation scheme applied to the parity bit stream.

Figure 6:
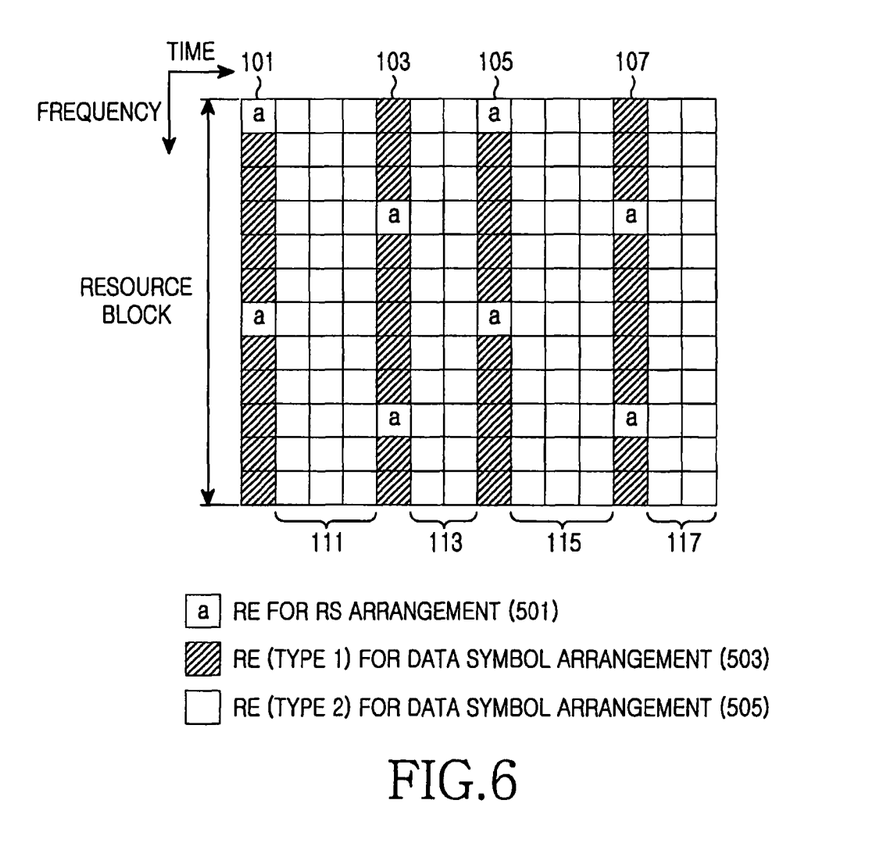
FIG. 6 is a diagram for a description of symbol mapping according to an embodiment of the present invention.

FIG. 6 is a diagram for a description of symbol mapping for REs. REs 501 where RSs will be arranged are arranged as described in FIGS. 1 and 2. In an example of FIG. 6, since one transmit antenna is considered, only RSs for a first transmit antenna are defined. REs where RSs for other transmit antennas are scheduled to be arranged are used for transmitting data symbols. REs where data symbols will be arranged are divided into two types. First type REs 503 for data symbols (hereinafter "first-type data symbol REs 503") are REs for data transmission, defined in OFDM symbols 101, 103, 105 and 107 including RSs, and second type REs for data symbols (hereinafter "second-type data symbol REs 505") are REs for data transmission, defined in OFDM symbols 111, 113, 115 and 117 including no RS. As stated in Equation (2), the first-type data symbol REs 503 are allocated lower power than the second-type data symbol REs 505 due to the need for sufficient power allocation for RSs.

The present invention defines a method for mapping modulation symbols to REs so that a systematic modulation symbol stream composed of a systematic bit stream should not be arranged in the first-type data symbol RE s 503. A parity modulation symbol stream composed of a parity bit stream can be arranged in either the first-type data symbol REs 503 or the second-type data symbol REs 505.

The reason for this mapping scheme is because a system protecting systematic bits shows higher performance than a system protecting parity bits. Since lower power is allocated to the first-type data symbol REs 503 and higher power is allocated to the second-type data symbol REs 505, it is preferable that the systematic modulation symbols are arranged in the in the second-type data symbol REs 505.

When a channel coding rate is low, due to the low ratio of systematic bits, there may be remaining second-type data symbol REs even after all the systematic bits are arranged in the second-type data symbol REs. In this case, parity modulation symbols are arranged in the first-type data symbol REs and the remaining second-type data symbol REs.

When the channel coding rate is high, due to the high ratio of systematic bits, there may be remaining systematic modulation symbols even after the systematic bits are arrange in the second-type data symbol REs. In this case, the parity modulation symbols and the remaining systematic modulation symbols are arranged in the first-type data symbol REs.

In sum, modulation symbols are arranged so that the systematic modulation symbols are first arranged in REs of OFDM symbols including no RS.

Example of Mapping Rule

A description will now be made of an example of realizing a mapping rule proposed by the present invention. In this example, a systematic modulation symbol stream and a parity symbol stream are separately interleaved. The interleaving is an operation of permuting symbol streams so that consecutive bit errors (burst error) should not occur in the channel-coded bit stream. If systematic parts and parity parts undergo interleaving independently, the systematic modulation symbol stream and the parity modulation symbol stream are not mixed. The two symbol streams are concatenated such that the systematic modulation symbol stream is followed by the parity modulation symbol stream. As a result, the modulation symbols located in the front are systematic modulation symbols, and the modulation symbols located in the rear are parity modulation symbols. The symbol streams concatenated in this way are mapped to the REs in the following order.

FIG. 6 is a diagram for a description of symbol mapping according to an embodiment of the present invention.

A concatenated symbol stream is sequentially arranged in REs defined in 3 OFDM symbols 111 of FIG. 6 in such a manner that frequency tones are first filled sequentially, and after frequency tones of one RB are fully filled up, REs of the next OFDM symbol are filled. When all REs of the OFDM symbols 111 are fully filled up, REs of the OFDM symbols are filled with the remaining symbol stream in the order of OFDM symbols 113, 115 and 117, and thereafter, in the order of OFDM symbols 101, 103, 105 and 107. Since the use of the above mapping method locates the systematic modulation symbols in the front, the second-type data symbol REs are filled first with the systematic modulation symbols.

An alternative embodiment can first sequentially insert modulation symbols along the time domain in the intervals 111, 113, 115 and 117 including no RS, which are intervals where OFDM symbols are filled, and then sequentially fill the intervals with the modulation symbols after going to the next frequency tones.

Figure 7:
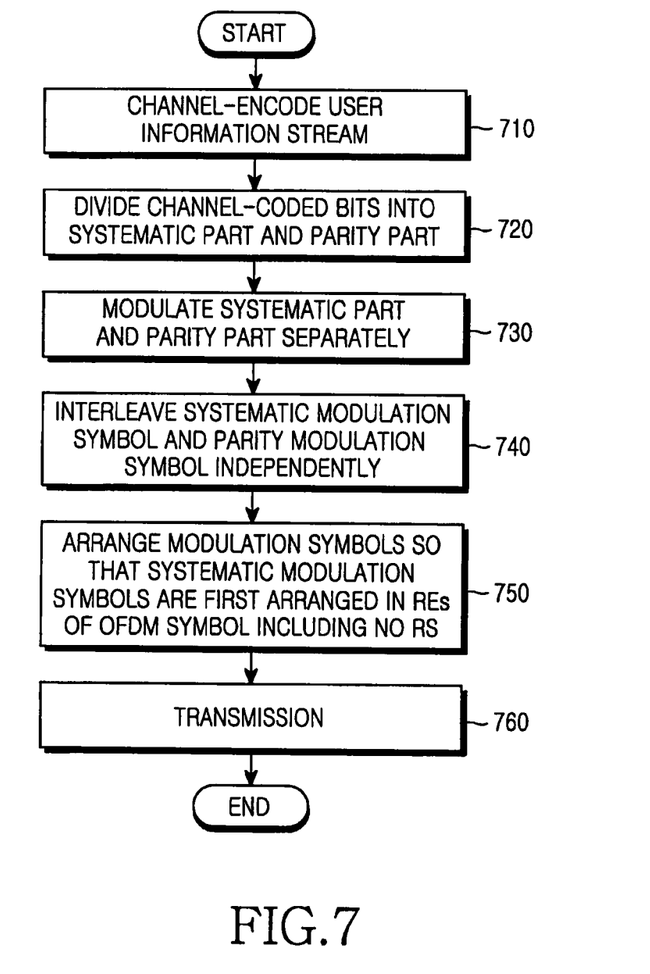
FIG. 7 is a signal flow diagram illustrating an operation of a transmitter according to an embodiment of the present invention.

FIG. 7 is a signal flow diagram illustrating an operation of a transmitter according to an embodiment of the present invention.

In step 710, the transmitter channel-encodes a user information stream. In step 720, the transmitter divides the channel-coded bits into a systematic bit stream and a parity bit stream. In step 730, the transmitter converts the systematic bit stream and the parity bit stream into a systematic modulation symbol stream and a parity modulation symbol stream through modulation separately. In step 740, the transmitter interleaves the systematic modulation symbol stream and the parity modulation symbol stream independently. Thereafter, in step 750, the transmitter arranges modulation symbols so that the systematic modulation symbols are first arranged in REs of OFDM symbols including no RS. Finally, in step 760, the transmitter performs transmission processing processes such as a process of multiplexing the modulation symbols with another user's data channel, control channel, RS signal, etc., an IFFT and CP attachment process for completing an OFDM signal, and a Radio Frequency (RF) processing process.

A receiver should rearrange a received modulation symbol stream according to the mapping rule considered in step 750, and deinterleave the systematic modulation symbols and the parity modulation symbols separately. Since such a demapping method in the receiver is a reverse process of the symbol mapping method of a mapper in the transmitter, a detailed description thereof will be omitted herein.

Figure 8:
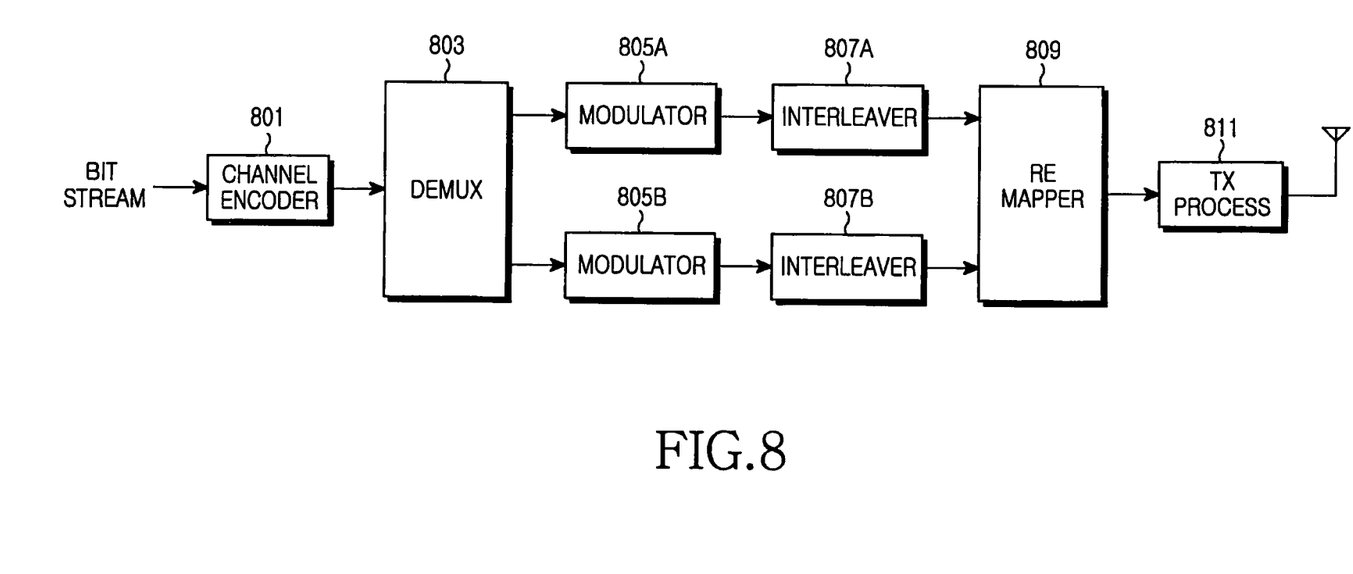
FIG. 8 is a diagram illustrating a structure of a base station's transmitter according to an embodiment of the present invention.

FIG. 8 is a diagram illustrating a structure of a base station's transmitter according to an embodiment of the present invention.

A user bit stream is input to a channel encoder 801 where it is converted into a coded bit stream. In a demultiplexer 803, the coded bit stream is divided into a systematic bit stream and a parity bit stream, and the systematic bit stream and the parity bit stream undergo separate modulations 805A and 805B and interleavings 807A and 807B, respectively. Reference numerals 805A and 807A represent a modulator and an interleaver for the systematic bit stream and the systematic symbol stream, and reference numerals 805B and 807B represent a modulator and an interleaver for the parity bit stream and the parity symbol stream. As provided by the present invention, the systematic symbol stream is first arranged in REs of OFDM symbols including no RS by means of an RE mapper 809. The symbol stream output from the RE mapper 809 is transmitted after undergoing, in a transmission processor 811, a transmission processing process such as multiplexing with other channels, IFFT, CP attachment, RF processing, etc.

Figure 9:
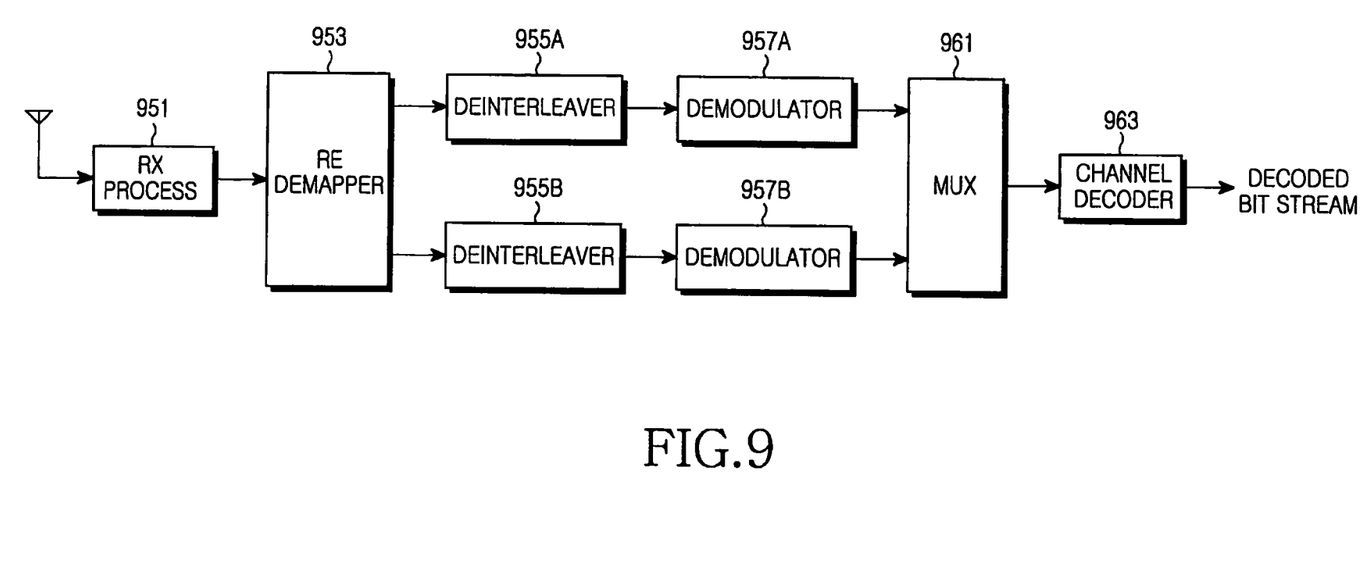
FIG. 9 is a diagram illustrating a structure of a terminal's receiver according to an embodiment of the present invention.

FIG. 9 is a diagram illustrating a structure of a terminal's receiver according to an embodiment of the present invention.

Regarding a received signal, a reception processor 951 receives a signal of an RB that the user is allocated, through a reception processing process such as RF processing, CP detachment, FFT, demultiplexing with other channels, channel estimation, etc. An RE demapper 953 rearranges in reverse the received modulation symbol stream according to the arrangement rule of the modulation symbols, used by the RE mapper 809 in FIG. 8 of the transmitter. The systematic parts in the received symbol stream undergo deinterleaving in a deinterleaver 955A and demodulation in a demodulator 957A, thereby being restored as a systematic bit stream, and the parity parts undergo deinterleaving in a deinterleaver 955B and demodulation in a demodulator 957B, thereby being restored as a parity bit stream. The restored systematic bit stream and parity bit stream are united into one received bit stream by means of a multiplexer 961, and restored to a decoded bit stream by means of a channel decoder 963.

As is apparent from the foregoing description, the present invention provides for arranging modulation symbols so that the systematic modulation symbols should be first arranged in REs of OFDM symbols including no RS. Since REs of OFDM symbols including RSs (i.e., the first-type data symbol REs) are allocated lower power than REs of OFDM symbols including no RS (i.e., the second-type data symbol REs), when systematic modulation symbols are arranged in the REs of OFDM symbol including no RS if possible, the systematic modulation symbols are first allocated more power compared to the parity modulation symbols. In the same condition, since protecting the systematic bits improves the decoding performance compared to protecting the parity bits, application of the arrangement rule proposed by the present invention can contribute to a decrease in an error rate.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for mapping reference symbols and modulation symbols in a transmitter of a mobile communication system, the method comprising:
   channel-encoding and modulating a user information stream to be transmitted;
   generating a systematic symbol stream containing systematic modulation symbols and a parity symbol stream containing parity modulation symbols using the user information stream; and
   preferentially and sequentially arranging a first portion of the systematic modulation symbols along a frequency domain in a symbol interval including no reference symbol;
   sequentially arranging a second portion of the systematic modulation symbols along the frequency domain in a next symbol interval including no reference symbol; and
   arranging the parity modulation symbols in a symbol interval including at least one reference symbol.

2. The method of claim 1, wherein generating the systematic symbol stream and the parity symbol stream comprises:
   dividing channel-coded bits into a systematic bit stream and a parity bit stream;
   modulating the systematic bit stream and the parity bit stream separately, to convert them into a systematic symbol stream and a parity symbol stream, respectively; and
   interleaving the systematic symbol stream and the parity symbol stream independently.

3. A method for mapping reference symbols and modulation symbols in a transmitter of a mobile communication system, the method comprising:
   channel-encoding and modulating a user information stream to be transmitted;
   generating a systematic symbol stream containing systematic modulation symbols and a parity symbol stream containing parity modulation symbols using the user information stream;
   preferentially and sequentially arranging the systematic modulation symbols along a time domain in symbol intervals including no reference symbol in one frequency tone;
   sequentially arranging the systematic modulation symbols along the time domain in the symbol intervals in a next frequency tone; and
   arranging the parity modulation symbols in a symbol interval including at least one reference symbol.

4. The method of claim 3, wherein generating the systematic symbol stream and the parity symbol stream comprises:
   dividing channel-coded bits into a systematic bit stream and a parity bit stream;
   modulating the systematic bit stream and the parity bit stream separately, to convert them into the systematic symbol stream and the parity symbol stream, respectively; and
   interleaving the systematic symbol stream and the parity symbol stream independently.

5. An apparatus for mapping modulation symbols and reference symbols in a transmitter of a mobile communication system, the apparatus comprising:
   a channel encoder configured to convert an input user bit stream into a coded bit stream;
   a demultiplexer configured to demultiplex the coded bit stream into a systematic bit stream and a parity bit stream;
   a first modulator configured to modulate the systematic bit stream;
   a second modulator configured to modulate the parity bit stream;
   a first interleaver configured to interleave systematic modulation symbols output from the first modulator;
   a second interleaver configured to interleave parity modulation symbols output from the second modulator; and
   a resource element mapper configured to preferentially arrange the systematic modulation symbols along a frequency domain in a symbol interval including no reference symbol, and to arrange the parity modulation symbols in a symbol interval including at least one reference symbol.

6. The apparatus of claim 5, wherein the resource element mapper preferentially and sequentially arranges the systematic modulation symbols along the frequency domain in the symbol interval including no reference symbol, and then sequentially arranges the systematic modulation symbols along the frequency domain in a next symbol interval including no reference symbol.

7. An apparatus for mapping modulation symbols and reference symbols in a transmitter of a mobile communication system, the apparatus comprising:
   a channel encoder configured to convert an input user bit stream into a coded bit stream;
   a demultiplexer configured to demultiplex the coded bit stream into a systematic bit stream and a parity bit stream;
   a first modulator configured to modulate the systematic bit stream;
   a second modulator configured to modulate the parity bit stream;
   a first interleaver configured to interleave systematic modulation symbols output from the first modulator;
   a second interleaver configured to interleave parity modulation symbols output from the second modulator; and
   a resource element mapper configured to preferentially and sequentially arrange the systematic modulation symbols along a time domain in symbol intervals including no reference symbol in one frequency tone, and then sequentially arrange the systematic modulation symbols along the time domain in the symbol interval in a next frequency tone.

* * * * *